(12) United States Patent
Fang et al.

(10) Patent No.: US 9,713,067 B2
(45) Date of Patent: Jul. 18, 2017

(54) REVERSE LINK SIGNALING TECHNIQUES FOR WIRELESS COMMUNICATION SYSTEMS

(75) Inventors: Yonggang Fang, San Diego, CA (US); Xiaowu Zhao, Shenzhen (CN); Ting Lu, Beijing (CN); Rajesh Bhalla, Gahanna, OH (US)

(73) Assignee: ZTE (USA) Inc., Richardson, TX (US)

( * ) Notice: Subject to any disclaimer, the term of this patent is extended or adjusted under 35 U.S.C. 154(b) by 1231 days.

(21) Appl. No.: 12/777,210

(22) Filed: May 10, 2010

(65) Prior Publication Data

US 2010/0309862 A1 Dec. 9, 2010

Related U.S. Application Data

(60) Provisional application No. 61/176,876, filed on May 8, 2009, provisional application No. 61/256,919, filed on Oct. 30, 2009.

(51) Int. Cl.
*H04W 48/08* (2009.01)
*H04L 1/00* (2006.01)

(52) U.S. Cl.
CPC ........... *H04W 48/08* (2013.01); *H04L 1/0025* (2013.01); *H04L 1/0027* (2013.01)

(58) Field of Classification Search
None
See application file for complete search history.

(56) References Cited

U.S. PATENT DOCUMENTS

| | | | |
|---|---|---|---|
| 6,005,852 A * | 12/1999 | Kokko et al. | 370/329 |
| 7,075,913 B1 | 7/2006 | Yavuz et al. | |
| 7,126,924 B2 * | 10/2006 | Suzuki et al. | 370/311 |
| 7,602,800 B2 * | 10/2009 | Endo et al. | 370/420 |
| 7,760,700 B2 * | 7/2010 | Frederiks et al. | 370/347 |
| 7,864,701 B2 * | 1/2011 | Matusz | 370/254 |
| 7,916,675 B2 * | 3/2011 | Dalsgaard et al. | 370/311 |
| 7,929,950 B1 * | 4/2011 | Rao et al. | 455/414.1 |
| 8,134,963 B1 * | 3/2012 | Chen et al. | 370/329 |
| 2001/0043577 A1 * | 11/2001 | Barany et al. | 370/328 |
| 2001/0046879 A1 * | 11/2001 | Schramm et al. | 455/525 |
| 2002/0067694 A1 * | 6/2002 | Cheng et al. | 370/230 |
| 2002/0167913 A1 | 11/2002 | Leung | |
| 2003/0017831 A1 * | 1/2003 | Lee et al. | 455/453 |

(Continued)

FOREIGN PATENT DOCUMENTS

| | | | |
|---|---|---|---|
| CN | 1423889 A | 6/2003 | |
| CN | 1599997 A | 3/2005 | |

(Continued)

OTHER PUBLICATIONS

International Search Report and Written Opinion mailed on Jun. 4, 2010 for International Application No. PCT/US2009/061738, filed Oct. 22, 2009 (7 pages).

(Continued)

*Primary Examiner* — Chirag Shah
*Assistant Examiner* — Joshua Smith
(74) *Attorney, Agent, or Firm* — Perkins Coie LLP

(57) ABSTRACT

Techniques, apparatuses, and systems are described for wireless communications. In one implement, wireless communication systems can provide one or more mechanisms to reduce reverse overhead control signaling by adaptively transmitting overhead control information.

19 Claims, 12 Drawing Sheets

(56) References Cited

U.S. PATENT DOCUMENTS

| | | |
|---|---|---|
| 2003/0039224 A1* | 2/2003 | Koo et al. .................. 370/328 |
| 2003/0067907 A1 | 4/2003 | Rezaiifar et al. |
| 2003/0072278 A1* | 4/2003 | Wu et al. .................... 370/329 |
| 2003/0128683 A1 | 7/2003 | Duncan Ho et al. |
| 2003/0174662 A1 | 9/2003 | Malkamaki |
| 2004/0127221 A1* | 7/2004 | Takano ................ H04W 88/08 455/445 |
| 2004/0132496 A1 | 7/2004 | Kim et al. |
| 2004/0136344 A1* | 7/2004 | Kim et al. .................... 370/335 |
| 2004/0229604 A1* | 11/2004 | Fong et al. ................ 455/422.1 |
| 2005/0020213 A1* | 1/2005 | Azman et al. ............. 455/67.11 |
| 2005/0043051 A1 | 2/2005 | Takano et al. |
| 2005/0048933 A1 | 3/2005 | Wu |
| 2005/0053038 A1* | 3/2005 | Kimura ................ H04L 1/0021 370/333 |
| 2005/0075108 A1 | 4/2005 | Cho et al. |
| 2005/0108615 A1 | 5/2005 | An et al. |
| 2005/0185583 A1* | 8/2005 | Hosein ......................... 370/232 |
| 2005/0201296 A1* | 9/2005 | Vannithamby et al. ...... 370/241 |
| 2005/0213505 A1 | 9/2005 | Iochi et al. |
| 2005/0237994 A1 | 10/2005 | Fong et al. |
| 2006/0030323 A1* | 2/2006 | Ode ........................ H04W 36/30 455/436 |
| 2006/0126558 A1* | 6/2006 | Lee et al. ..................... 370/329 |
| 2006/0285515 A1* | 12/2006 | Julian et al. .................. 370/328 |
| 2007/0010253 A1 | 1/2007 | Gunnarsson et al. |
| 2007/0015476 A1 | 1/2007 | Akbar Attar et al. |
| 2007/0054689 A1* | 3/2007 | Baker ................... H04L 1/0026 455/522 |
| 2007/0091786 A1* | 4/2007 | Li et al. ....................... 370/204 |
| 2007/0091817 A1* | 4/2007 | Yoon ..................... H04L 1/0026 370/252 |
| 2007/0115796 A1* | 5/2007 | Jeong ................... H04L 1/0026 370/203 |
| 2007/0195908 A1* | 8/2007 | Attar et al. ................... 375/267 |
| 2008/0039022 A1 | 2/2008 | Wei et al. |
| 2008/0049667 A1 | 2/2008 | Rong et al. |
| 2008/0057969 A1* | 3/2008 | Agami .................. H04L 1/0026 455/450 |
| 2008/0075033 A1* | 3/2008 | Shattil ........................... 370/328 |
| 2008/0161003 A1* | 7/2008 | Brueck ................. H04W 36/30 455/437 |
| 2008/0170523 A1* | 7/2008 | Han ....................... H04B 7/0413 370/310 |
| 2008/0186944 A1 | 8/2008 | Suzuki et al. |
| 2009/0022178 A1 | 1/2009 | Ji et al. |
| 2009/0130985 A1* | 5/2009 | Lee et al. ................... 455/67.11 |
| 2009/0180414 A1 | 7/2009 | Maeda et al. |
| 2009/0207794 A1* | 8/2009 | Meylan ........................ 370/329 |
| 2009/0268655 A1* | 10/2009 | Bertz et al. ................... 370/312 |
| 2009/0303968 A1 | 12/2009 | Jou et al. |
| 2010/0015988 A1* | 1/2010 | Goransson ............ H04L 1/0025 455/452.2 |
| 2010/0077272 A1 | 3/2010 | Peisa et al. |
| 2010/0091735 A1 | 4/2010 | Kim et al. |
| 2010/0150069 A1 | 6/2010 | Fang et al. |
| 2010/0195502 A1 | 8/2010 | Lundby |
| 2012/0020248 A1* | 1/2012 | Granlund ............. H04W 28/18 370/254 |
| 2012/0039207 A1* | 2/2012 | Eriksson ............... H04L 1/0015 370/252 |

FOREIGN PATENT DOCUMENTS

| | | |
|---|---|---|
| CN | 1679270 A | 10/2005 |
| CN | 101238753 A | 8/2008 |
| EP | 1 526 673 A1 | 4/2005 |
| JP | 2004-064691 A | 2/2004 |
| JP | 2004-080235 A | 3/2004 |
| JP | 2005-176325 A | 6/2005 |
| WO | 01/63898 A2 | 8/2001 |
| WO | 03/032564 A2 | 4/2003 |
| WO | 2004/006491 A1 | 1/2004 |
| WO | 2006/138339 A2 | 12/2006 |
| WO | 2010/048451 A2 | 4/2010 |

OTHER PUBLICATIONS

International Search Report and Written Opinion mailed on Dec. 28, 2010 for International Application No. PCT/US2010/034268, filed May 10, 2010 (7 pages).

Office Action mailed Jan. 21, 2014 for Japanese Patent Application No. 2011-533354, filed Oct. 22, 2009 (3 pages).

Office Action mailed Aug. 12, 2014 for Japanese Patent Application No. 2011-533354, filed Oct. 22, 2009 (5 pages).

* cited by examiner

REVERSE LINK SIGNALING TECHNIQUES FOR WIRELESS COMMUNICATION SYSTEMS

PRIORITY CLAIM AND CROSS REFERENCE TO RELATED APPLICATIONS

This patent document claims the benefit of the priority of U.S. Provisional Application Ser. No. 61/176,876, filed May 8, 2009, entitled "Reverse Link Signaling Techniques For Wireless Communication Systems," and claims the benefit of the priority of U.S. Provisional Application Ser. No. 61/256,919, filed Oct. 30, 2009, entitled "Reverse Link Signaling Techniques For Wireless Communication Systems," the entire contents of which are incorporated by reference as part of the disclosure of this document.

BACKGROUND

This document relates to wireless communications in wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station emits radio signal that carry data such as voice data and other data content to wireless devices. A base station can be referred to as an access point (AP) or access network (AN) or can be included as part of an access network or a base station subsystem (BSS). Further, a wireless communication system can include a core network that is in communication with one or more base stations. A base station can transmit a radio signal on a forward link (FL), also called a downlink (DL), to one or more wireless devices. A wireless device can transmit a radio signal on a reverse link (RL), also called an uplink (UL), to one or more base stations.

Wireless technologies such as ones based on High Rate Packet Data (HRPD) uses reverse link signaling to provide feedback information of a forward link condition to a base station. Based on the feedback information, the base station can select a modulation scheme and coding rate for the receiving radio environment at the wireless device. To assist a base station to demodulate and decode reverse link data, a wireless device can transmit a data rate indication associated with data transmitted over the reverse link traffic channel. A wireless device can transmit feedback information such as Data Rate Control (DRC) information and Data Source Control (DSC).

A physical (PHY) layer in a wireless technologies can include a single carrier multi-link feature. For example, a wireless communication system can transmit data over two or more forward links. Supporting single carrier multi-link can include providing two or more reverse link connections such as separate reverse link long codes mask to transmit two or more sets of DRC and DSC information for control of first and second forward links respectively. In some wireless communication systems, a PHY layer includes forward link multiple-in-multiple-out (MIMO) communications. Feedback for MIMO communications can include using two or more reverse link overhead channels for the feedback of forward link condition. Various examples of MIMO based overhead channels include a Spatial Signature Indication (SSI) used to indicates pre-coding matrix Index and a Spatial Rank Indication (SRI) used to indicate channel dimensionality.

SUMMARY

This patent document describes technologies, among other things, for wireless communications such as technologies for adaptive reverse link control signaling and fixed transmission signaling.

In one aspect, techniques for adaptive reverse link control signaling can include using adaptive reverse link overhead channel information transmission, which provides for a wireless device to suppress a transmission of reverse link overhead control information when such information is not required to be sent over the reverse link. Techniques can include operating a base station to transmit an indication that the base station supports adaptive transmission of reverse link overhead information over a reverse link, communicating with a wireless device that adaptively transmits overhead channel information, receiving information, including first overhead control information, from the wireless device, and using the first data control information for communications with the wireless device until the base station receives second overhead control information from the wireless device. Techniques can include operating a wireless device to communicate with a base station to establish adaptive overhead channel transmissions. In adaptive transmission, the wireless device can transmit overhead channel information based on the radio environment, previously transmitted information, and instruction from the base station. Other implementations can include corresponding systems, apparatus, and computer programs, configured to perform the actions of the techniques, encoded on computer readable mediums.

In another aspect, techniques can include operating a base station to establish communications with a wireless device, sending a fixed data control information request message to control the wireless device to use a fixed transmission rate on a reverse link, and operating the base station to use the fixed transmission rate for communications with the wireless device. Other implementations can include corresponding systems, apparatus, and computer programs, configured to perform the actions of the techniques, encoded on computer readable mediums.

In another aspect, techniques can include operating a base station to transmit an indication that the base station supports a fixed transmission rate on a reverse link, monitoring for information from a wireless device indicative of a fixed transmission rate request, and operating the base station to use the fixed transmission rate for communications with the wireless device. Techniques can include operating a wireless device to transmit an indication to a base station to enable a reverse link fixed rate transmission or suppress the transmission of reverse link rate indication associated with the data channel. Other implementations can include corresponding systems, apparatus, and computer programs, configured to perform the actions of the techniques, encoded on computer readable mediums.

In yet another aspect, techniques for adaptive reverse link control signaling can include communicating, to a wireless device from a network, information indicative of the network's support of a capability for adaptive reverse link overhead channel transmission, communicating with the wireless device to enable the capability, receiving, from the wireless device, an adaptive transmission of overhead channel information; and transmitting one or more data packets to the wireless device based on the received overhead control information. The capability, when enabled, can cause the wireless device to adaptively transmit, based on a detected change in a wireless channel condition, overhead channel information to control data packet transmissions to the wireless device. Other implementations can include corresponding systems, apparatus, and computer programs, configured to perform the actions of the techniques, encoded on computer readable mediums.

These and other implementations can include one or more of the following features. Implementations can include using the capability for Data Rate Control (DRC), Data Source Control (DSC), Spatial Signature Indication (SSI), and Spatial Rank Indication (SRI) channels. The capability can include independent transmissions over the DRC, DSC, SSI, and SRI channels as autonomously controlled by the wireless device. Implementations can include operating the wireless device to transmit first overhead channel information over a reserve link to the base station. Implementations can include operating, when the capability is enabled, the wireless device to suppress a transmission of second overhead channel information if the second overhead channel information is identical to the first overhead channel information. Implementations can include operating the wireless device to disable monitoring a DRC lock value when the DRC channel is not transmitted. Transmitting the one or more data packets can include using the received overhead channel information to schedule data transmission on a forward link when the capability is enabled. Implementations can include communicating with the wireless device to disable the capability.

In yet another aspect, techniques for adaptive reverse link control signaling can include communicating information to a wireless device about a capability for an access network controlled adaptive reverse link overhead channel transmission, communicating with the wireless device to enable the capability, receiving, from the wireless device, an adaptive transmission of overhead channel information, and transmitting one or more data packets to the wireless device based on the received overhead control information. The capability, when enabled, can cause the wireless device to adaptively transmit, based on a detected change in a wireless channel condition, overhead channel information to control data packet transmissions to the wireless device. The access network can be configured to control the capability. Other implementations can include corresponding systems, apparatus, and computer programs, configured to perform the actions of the techniques, encoded on computer readable mediums.

These and other implementations can include one or more of the following features. Implementations can include transmitting an instruction to the wireless device to suppress future transmission of additional overhead channel information. Transmitting the instruction can include transmitting the instruction via a fast indication in a physical layer. Implementations can include using the capability for Data Rate Control (DRC), Data Source Control (DSC), Spatial Signature Indication (SSI), and Spatial Rank Indication (SRI) channels. Communicating with the wireless device to enable the capability can include transmitting a DRC lock indicator. Implementations can include operating the wireless device, based on the DRC lock indicator, to transmit the overhead channel information over a reserve link. Implementations can include causing the wireless device to suppress future transmission of additional overhead channel information when received DRC lock indicators for two or more active sectors indicate that a suppression is required. Transmitting the instruction can include transmitting, based on a lack of buffered data for the wireless device, a DRC lock value to control the wireless device to suppress future transmission of additional overhead channel information.

In another aspect, techniques for wireless communications can include operating a base station to transmit an indication that the base station supports receiving selective transmissions of data control information over a reverse link, communicating with a wireless device that is capable of selectively transmitting data control information to control data packet transmissions to the wireless device, receiving selectively transmitted information, comprising a first data control information, from the wireless device, and using the first data control information for communications with the wireless device until the base station receives second data control information from the wireless device. Other implementations can include corresponding systems, apparatus, and computer programs, configured to perform the actions of the techniques, encoded on computer readable mediums.

These and other implementations can include one or more of the following features. Data control information can include Data Rate Control (DRC) information for controlling a data rate of a data packet transmission. Data control information can include Data Source Control (DSC) information for indicating a wireless sector that is preferred by the wireless device for receiving a data packet transmission. Data control information can include Spatial Signature Indication (SSI) information that indicates a pre-coding matrix index. Data control information can include Spatial Rank Indication (SRI) information that indicates a channel dimensionality. Communicating with the wireless device can include causing the wireless device to selectively transmit data control information when a change in a wireless channel condition is detected. A wireless channel condition can be measured by an error rate associated with one or more packet data transmissions to the wireless device.

In another aspect, techniques for wireless communications can include establishing wireless communication with a wireless device, determining to transmit data to the wireless device at a fixed transmission rate, sending, based on an output of the determining, a fixed transmission request message to control the wireless device to suppress transmission of overhead channel information that controls data packet transmissions to the wireless device, where the fixed transmission request message indicates the fixed transmission rate, and using the fixed transmission rate to transmit data to the wireless device. Techniques can include sending an additional message to control the wireless device to start transmission of overhead channel information, receiving overhead channel information from the wireless device, and using the overhead channel information to transmit data to the wireless device. Other implementations can include corresponding systems, apparatus, and computer programs, configured to perform the actions of the techniques, encoded on computer readable mediums.

In another aspect, techniques for wireless communications can include transmitting, at a base station, an indication that the base station supports a fixed transmission rate on a reverse link, monitoring for a message from a wireless device, the message indicative of a request to use a fixed transmission rate for transmitting data over the reverse link to the base station, controlling the wireless device to use the fixed transmission rate, and using the fixed transmission rate for receiving data from the wireless device. Controlling the wireless device to use the fixed transmission rate can include causing the wireless device to suppress transmitting a data rate over a reverse rate indicator (RRI) channel. Other implementations can include corresponding systems, apparatus, and computer programs, configured to perform the actions of the techniques, encoded on computer readable mediums.

In another aspect, systems for wireless communications can include multiple base stations configured to communicate information to a wireless device about a capability for adaptive reverse link overhead channel transmission, the capability, when enabled, causing the wireless device to adaptively transmit, based on a detected change in a wireless channel condition, overhead channel information to control data packet transmissions to the wireless device, communicate with the wireless device to enable the capability, receive, from the wireless device, an adaptive transmission of overhead channel information, and transmit one or more data packets to the wireless device based on the received overhead control information.

These and other aspects and technical features associated with techniques, apparatuses, and systems for wireless communication system communications are set forth in the accompanying drawings, the description, and the claims.

BRIEF DESCRIPTION OF THE DRAWINGS

Like reference symbols in the various drawings indicate like elements.

DETAILED DESCRIPTION

This document describes techniques, apparatuses, and systems for adaptive reverse link control signaling transmission in wireless communication systems.

Figure 1:
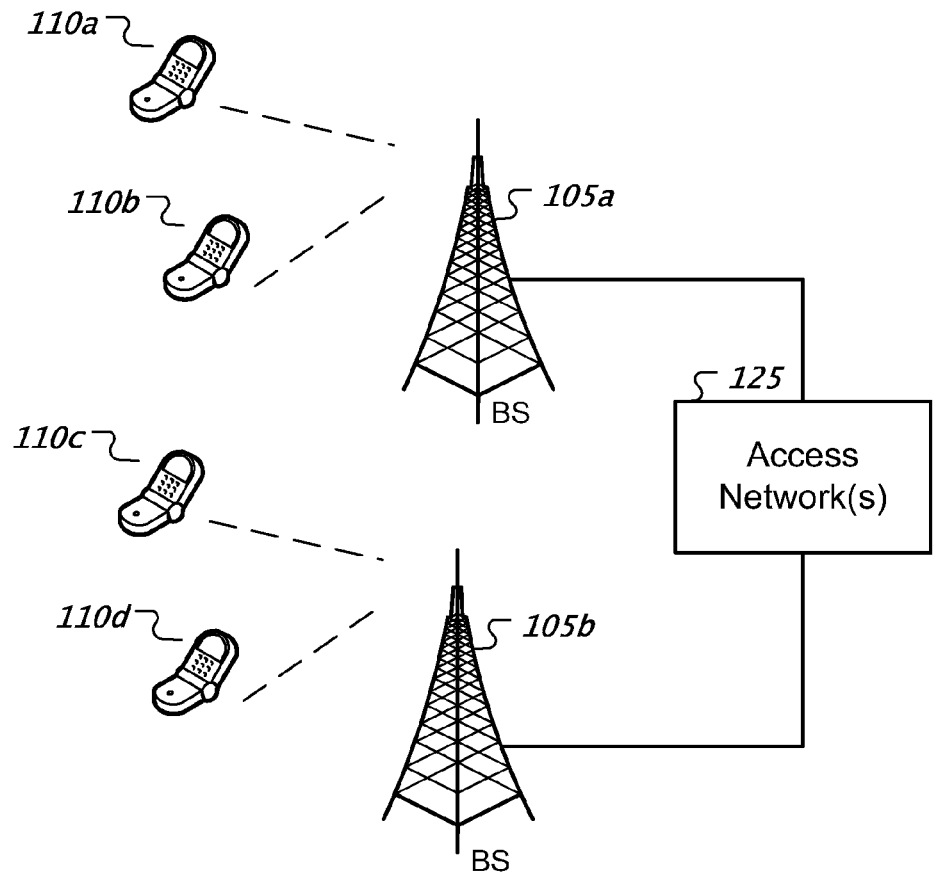
FIG. 1 shows an example of a wireless communication system.

FIG. 1 shows an example of a wireless communication system. A wireless communication system can include one or more base stations (BSs) 105a, 105b, one or more wireless devices 110a, 110b, 110c, 110d, and one or more access networks 125. The distance between a wireless devices 110a, 110b, 110c, 110d, and a base station 105a, 105b can vary. A base station 105a, 105b can provide wireless service to wireless devices 110a, 110b, 110c, 110d in one or more wireless sectors. In some implementations, a base station 105a, 105b includes directional antennas to produce two or more directional beams to provide wireless coverage in different sectors.

An access network 125 can communicate with one or more base stations 105a, 105b. In some implementations, an access network 125 includes one or more base stations 105a, 105b. The access network 125 can include wireless communication equipment such as one or more servers. In some implementations, the access network 125 is in communication with a core network that provides connectivity with other wireless communication systems and wired communication systems.

The wireless communication system can communicate with wireless devices 110a, 110b, 110c, 110d using a wireless technology such as one based on Code Division Multiple Access (CDMA). The wireless communication system can use one or more protocols for medium access control (MAC) and physical (PHY) layers. The techniques and systems described herein can be implemented in various wireless communication systems such as a system based on Evolution Data Optimized (EVDO) or High Rate Packet Data (HRPD) of the 3GPP2 organization.

Wireless channel conditions can fluctuate based on factors such as multi-path interference, channel fading, and wireless device mobility. Such factors can impact how a transmitted forward link signal is received by a wireless device. A wireless device can monitor one or more wireless channel conditions, e.g., monitoring a signal-to-noise (SNR) ratio, a signal-to-interference-plus-noise-rate (SINR), or a bit-error-ratio (BER). A wireless device can communicate the monitoring results to a based station which can, in turn, adjust transmission parameters, such as a data transmission rate, to improve communications with the wireless device.

Figure 2:
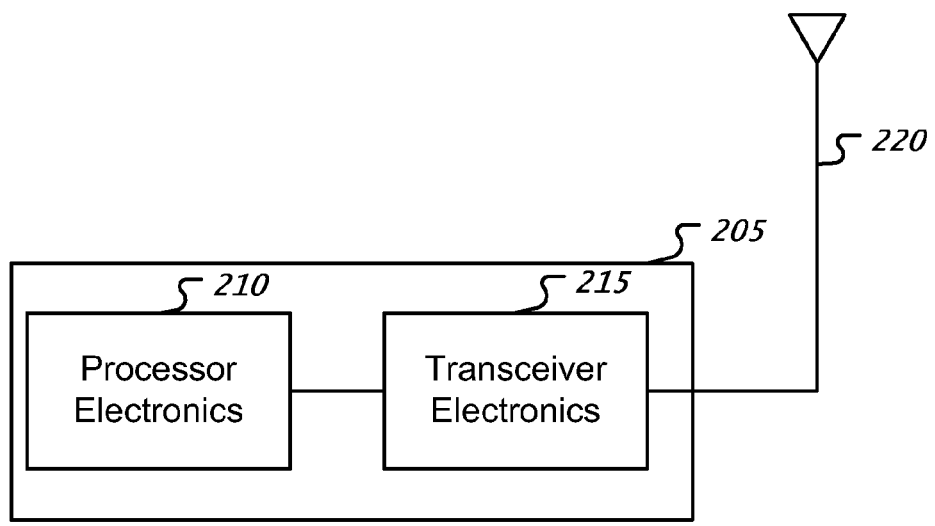
FIG. 2 shows an example of a radio station architecture.

FIG. 2 shows an example of a radio station architecture. A radio station 205 such as a base station or a wireless device can include processor electronics 210 such as a microprocessor that implements one or more of the techniques presented in this document. Radio station 205 can include transceiver electronics 215 to send and/or receive wireless signals over one or more communication interfaces such as antenna 220. In some implementations, a radio station 205 can include transceiver electronics 215 to send and/or receive wireless signals over two or more antennas 220. Radio station 205 can include other communication interfaces for transmitting and receiving data. Radio station 205 can include one or more memories configured to store information such as data and/or instructions. In some implementations, processor electronics 210 can include at least a portion of transceiver electronics 215.

Wireless technologies such as High Rate Packet Data (HRPD) wireless technology are based on cdma2000 1× technologies and provide optimized data transmission in packet data networks. A HRPD network can use a centralized network architecture to provide backward compatibility to existing cdma2000 1× based networks. A HRPD based wireless communication system can include access network equipment to provide radio link connections to wireless devices. The system can include a Packet Data Service Node (PDSN) configured as a serving access network gateway to a core network. The system can include a home agent which is used to provide an anchor point for mobility management and an Authentication-Authorization-Accounting (AAA)

server. In some implementations, access terminal equipment communicates with an access network over an air-interface specified by a HRPD radio access technology. In some implementations, a base station uses a time division duplex (TDD) transmission mechanism for forward link communications, and a wireless device uses CDMA for a reverse link communications.

Figure 3:
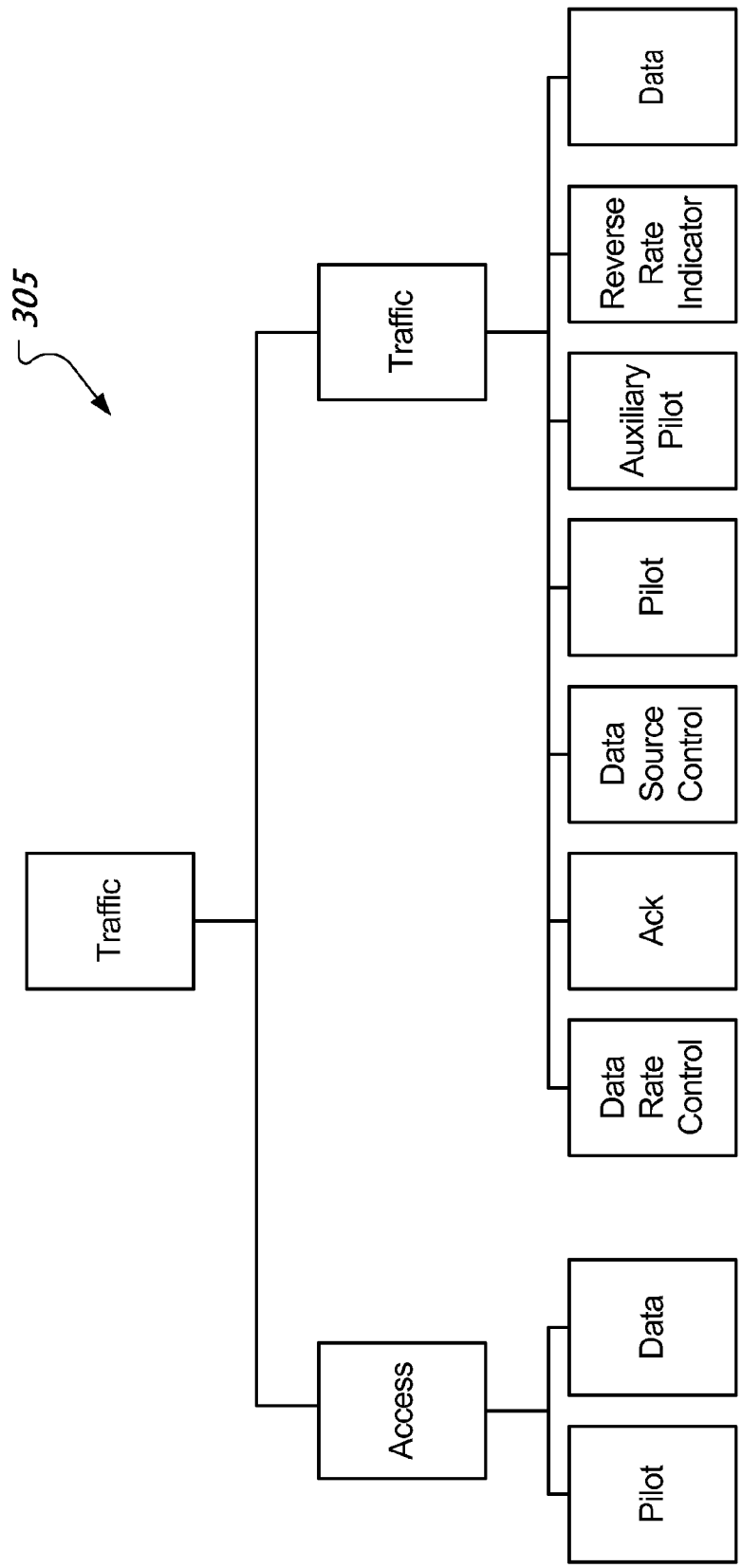
FIG. 3 shows an example of a reverse channel structure for HRPD communication.

FIG. 3 shows an example of a reverse channel structure for HRPD communication. A reverse channel structure 305 for a HRPD air link can include an access channel. The HRPD air link can include one or more traffic channels. An access channel can include a pilot channel and a data channel. A reverse link traffic channel can include one or more of: a data rate control (DRC) channel, acknowledgement (ACK) channel, data source control (DSC) channel, pilot channel, auxiliary pilot channel, reverse rate indicator (RRI) channel, and a data channel.

A DRC channel can be used to request a data rate that an access terminal can receive at from the forward traffic channel. In some implementations, a DRC channel can be used to request a sector that the access terminal wishes to receive from. In some implementations, a DRC channel contains 4-bit DRC value that is used to indicate a data rate. In some implementations, a DRC channel contains a 3-bits DRC cover that is used to indicate a preferred sector. In some implementations, a DRC channel is modulated by the Walsh code (16, 8).

An ACK channel can be used to indicate an acknowledgement status of packets received on a forward link. In some implementations, an ACK channel is a one bit channel. In some implementations, an ACK channel is modulated by the Walsh code (32, 12).

A DSC channel can be used to indicate a data source sector that the access terminal prefers to receive from in the following frames. In some implementations, a DSC Channel uses a 3-bit value to indicate the a preferred sector. In some implementations, a DSC Channel is modulated by the Walsh code (32, 12).

A traffic pilot channel can be used to provide a reference signal for an access network to demodulate and decode the reverse link signal. A traffic auxiliary pilot channel can be used to provide a reference signal for an access network to demodulate and decode the reverse link signal.

A RRI channel can be used to indicate a transmission rate of reverse link data. In some implementations, a RRI channel uses a 3-bit value. In some implementations, a RRI channel is modulated by the Walsh code (16, 4).

A traffic data channel can be used to carry user data. In some implementations, a traffic data channel is modulated by the Walsh code (4, 2). In some implementations, a traffic data channel is modulated by the Walsh code (2, 1).

Figure 4:
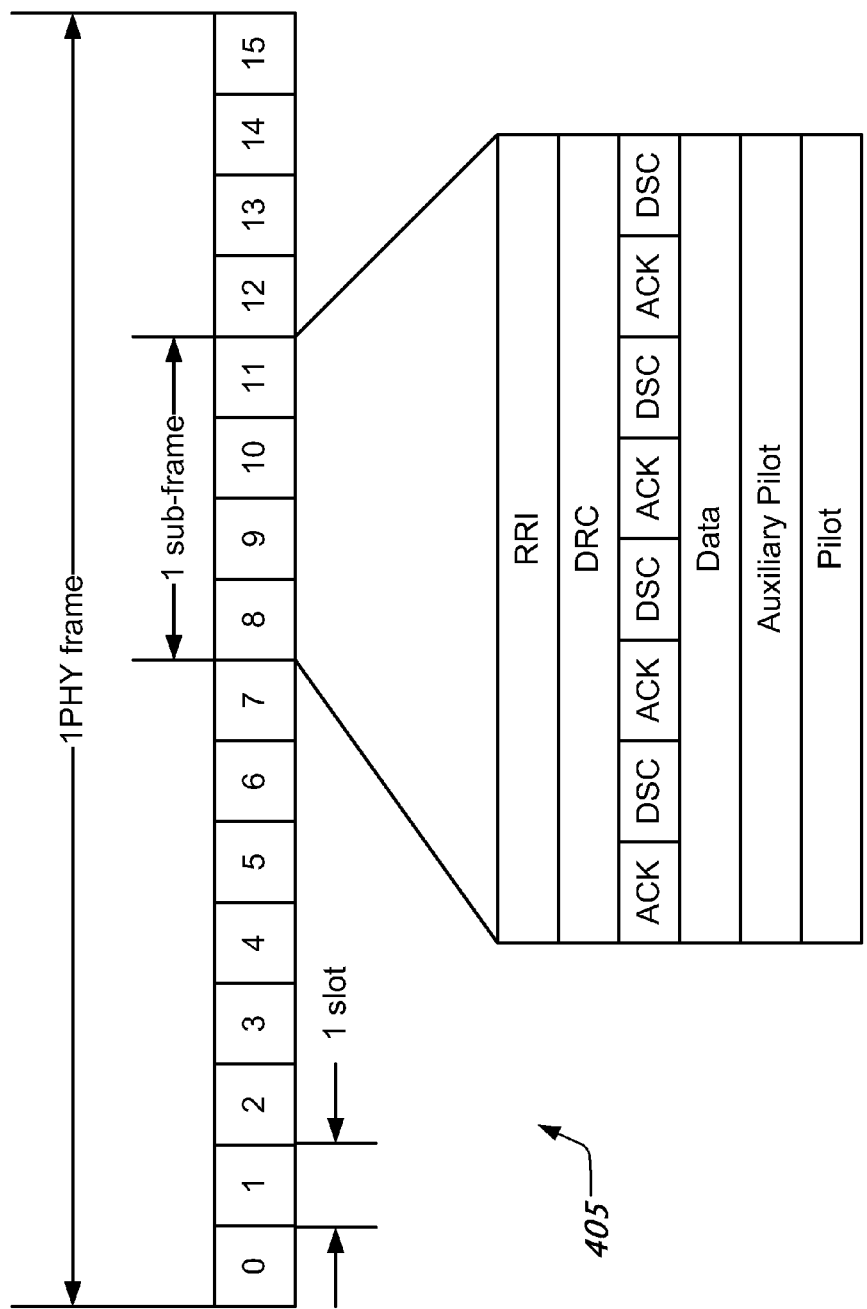
FIG. 4 shows an example of a reverse link transmission based on HRPD.

FIG. 4 shows an example of a reverse link transmission based on HRPD. A HRPD reverse link physical frame 405 is partitioned into four sub-frames. Each of these sub-frames includes four slots. Thus, a physical frame 405 can include 16 transmission slots. Such a sub-frame structure in the physical frame 405 can provide enough time for an access network's receiver to demodulate and decode a reverse link signal, and perform early termination, e.g., hybrid automatic repeat request (HARM). A sub-frame can include a pilot channel, an auxiliary pilot channel, one or more control channels, e.g., RRI, DRC, DSC, or ACK, and a data channel. In some implementations, the sub-frame can include two or more channels that are modulated on different Walsh codes so that an access network can demodulate and decode information based on Walsh code channel assignments.

Forward link transmission parameters can be adjusted based on changing radio signal environments. Therefore, a wireless communication system can provide control channels on the reverse link to control forward link transmissions. A wireless device can transmit information, such as a preferred data rate or data source, on one or more overhead control channels to cause an access networks, for example, to select a source base station, a forward link, and a transmission rate for a future forward link transmission to the wireless device.

Reverse link control channels, however, can require a large portion of the reverse link transmit power of a wireless device. In a Voice-over-Internet-Protocol (VOIP) example, reverse link control channel overhead power is expressed as: For example in the VOIP cases, RL control channel Overhead Power equals Pilot Power*$(1+p1*(10^{(DRCgain\_sho/10)+10(DSCgain\_sho/10)})+(1-p1)(10^{(DRCgain\_nsho/10)}+10^{(DSCgain\_nsho/10)})+10^{(RRIgain/10)}+p2*(p1*10^{(ACKgain\_sho/10)}+(1-p1)*10^{(ACKgain\_nsho/10)}))$ and a RL Data Channel Power for VOIP equals Pilot Power*$v*10^{(T2P/10)}$. Where p1 represents a SHO factor, p2 represents a possibility of early termination in a subframe, v represents a voice activity factor, and T2P represents a Traffic to Pilot Ratio. In some implementations, a reverse link data channel power for the VOIP example is expressed as Pilot_Power*$v*10^{T2P}$, where v represents a voice activity factor and T2P represents a traffic-to-pilot ratio. For typical values settings on the reverse link control channels for VOIP, a wireless device can consume similar transmit power to carry the reverse link overhead channels to the reverse link data channel. For the best effort service cases, four best effort reverse link overhead channels would make the transmit power about equivalent to two VOIP reverse links. Consequently, those reverse link overhead control channel transmission can create interference to transmissions from other wireless devices, and in turn, limit system capacity by the reverse link performance.

A wireless communication system can provide a discontinuous transmission (DTX) mode. A DTX mode status can be either active (e.g., DTXMode=1) or inactive (e.g., DTXMode=0). A wireless device such as an access terminal can transmit channels such as DSC or DRC channels in sub-frames that are not associated with DTX to provide overhead control information for an access network to determine forward link transmission parameters. In some implementations, an access terminal transmits DRC and DSC channels regardless of whether a DRC rate is fixed or if there is only one connection, e.g., no handoff case. In some implementations, DRC and DSC channels are always transmitted when the DTX mode is inactive. In some implementations, the DRC and DSC channels are transmitted in the first half of a sub-frame when a DTX mode is active. The access terminal can transmit a reverse link pilot for the access network to demodulate and decode DRC and DSC information.

An access terminal can transmit a Reverse Rate Indicator (RRI) to indicate a reverse link transmission rate for an access network to demodulate and decode reverse link packets. An access terminal can transmit RRI when a DTX mode is inactive. An access terminal can transmit RRI in the first half of a slot when a DTX mode is active and a DTX RRI mode is inactive. An access terminal can transmit RRI in the data subframes when a DTX mode is active and a DTX RRI mode is active. For VOIP services, the reverse link data can be constantly fed by an access terminal's vocoder. The data rate from the vocoder can be fixed and low, such as 9.6 kbps or 4.8 kbps. Operating an access terminal to constantly transmit RRI in this case may result in increased overhead control transmission and increased interference on the reverse link.

The technologies described in this document can be used to reduce reverse link control channel overhead, increase reverse link capacity, and in turn, can improve the overall system performance. The described technologies include, among other things, mechanisms for an adaptive transmission of one or more reverse link overhead channels (e.g., DRC, DSC, SRI, or SSI), mechanisms for a fixed transmission of DRC and DSC information, and mechanisms for a reverse link fixed rate transmission. In some implementations, an adaptive overhead channel transmission mechanism can include an access terminal controlled adaptive transmission on one or more reverse link overhead channels such as DRC, DSC, SRI, or SSI. In some implementations, an adaptive overhead channel transmission mechanism can include an access network controlled adaptive transmission on channels such as DRC, DSC, SRI, or SSI.

In an access terminal adaptive transmission mechanism, an access terminal can autonomously determine a transmission of overhead control information based on previously transmitted information. A transmission of overhead control information can include one or more overhead control parameter values, such as DRC, DSC, SSI, or SRI parameter values. For example, if the newly determined overhead control parameter values are different from previously transmitted parameter values, the access terminal can transmit the new parameter values. If, on the other hand, the newly determined overhead control parameter values are the same as the previously transmitted parameter values, the access terminal is not required to transmit the new parameter values.

An access network can transmit data over a forward traffic channel based on one or more overhead control parameters, such as DRC, DSC, SSI, or SRI parameters, that are determined by an access terminal adaptive transmission mechanism. For example, an access network can transmit new data over the forward traffic channel to an access terminal using the previous overhead control parameters if the access network does not receive the parameters from the access terminal. An access terminal can selectively transmit overhead control parameters to the access network based on parameter changes. Based on receiving one or more overhead control parameters from an access terminal, the access network can use the received one or more parameters for a future forward link transmission. In some implementations, an adaptive overhead channel transmission is independent amongst DRC, DSC, SSI and SRI. Based on activating an access terminal adaptive transmission mechanism, an access terminal can transmit overhead control information individually, e.g., adaptively transmit DRC information, adaptively transmit DSC information, adaptively transmit SSI information, and adaptively transmit SRI information.

An access network can use an adaptive transmission mechanism, such as an access network controlled adaptive reverse link overhead channel transmission mechanism, to send an indication when the transmission of reverse link overhead channels is not required. For example, when the access network does not have buffered data for the access terminal, the access network can send an indication to the access terminal to control the access terminal to suppress transmission of overhead control information such as overhead control parameters, e.g., DRC, DSC, SSI, or SRI on the reverse link.

Figure 5:
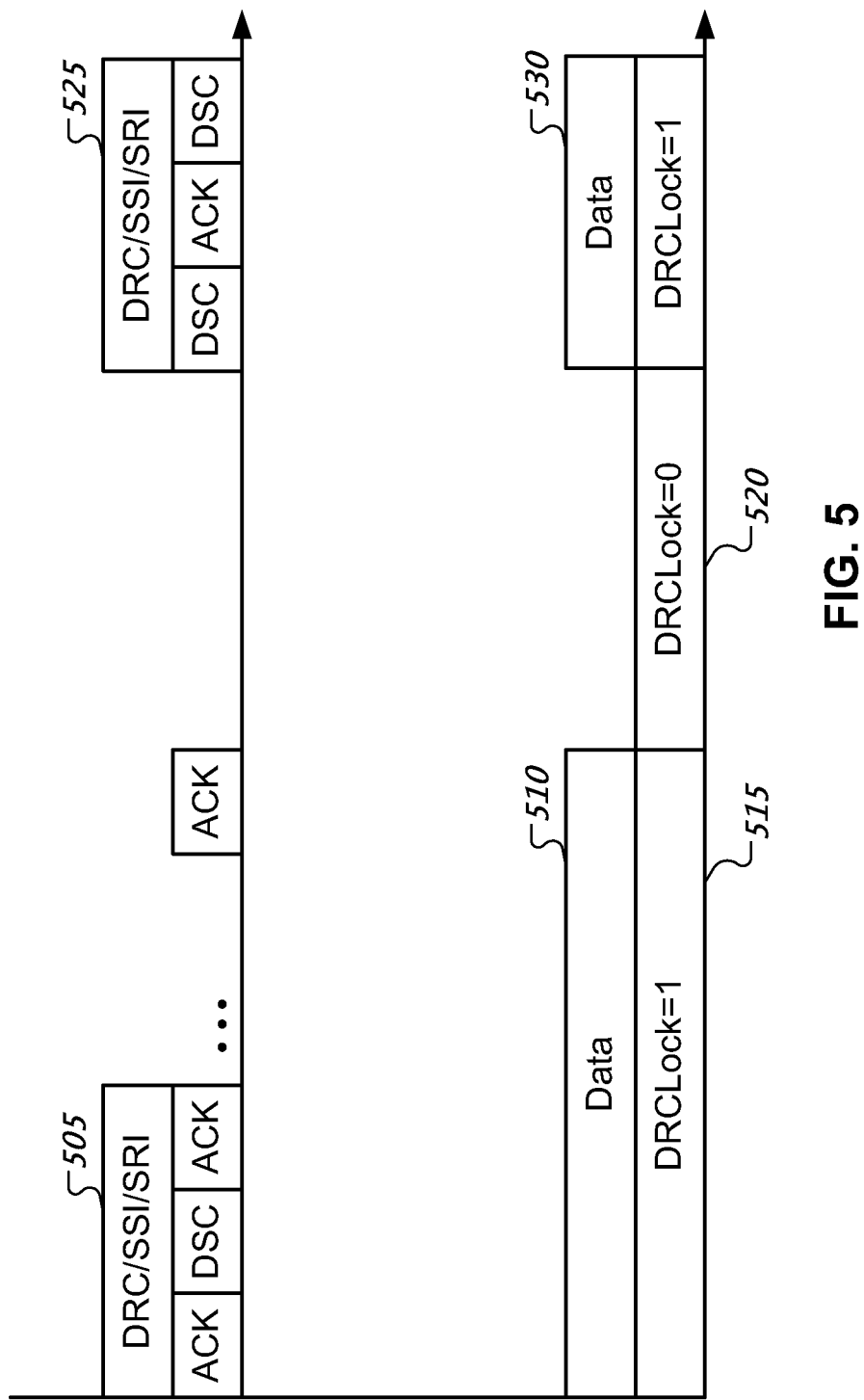
FIG. 5 shows an example of adaptive transmission for overhead control information between an access terminal and an access network.

FIG. 5 shows an example of adaptive transmission for overhead control information between an access terminal and an access network. Overhead control information can include one or more overhead control parameters such a data rate or a data source. An access terminal can send one or more overhead control parameters (505) to control a first transmission of data (510) on a forward link from an access network. When the access network does not have data for another forward link data transmission in a future frame, the access network can send a message (515) to indicate this lack of data. In some implementations, such a message (515) indicates that the access terminal is not required to send overhead control parameters. Based on the access network acquiring additional data for the access terminal, the access network can send a message (520) that indicate that the access terminal can start to transmit overhead control parameters. As before, the access terminal can send one or more overhead control parameters (525) to control a second transmission of data (530) on the forward link from the access network.

Figure 6:
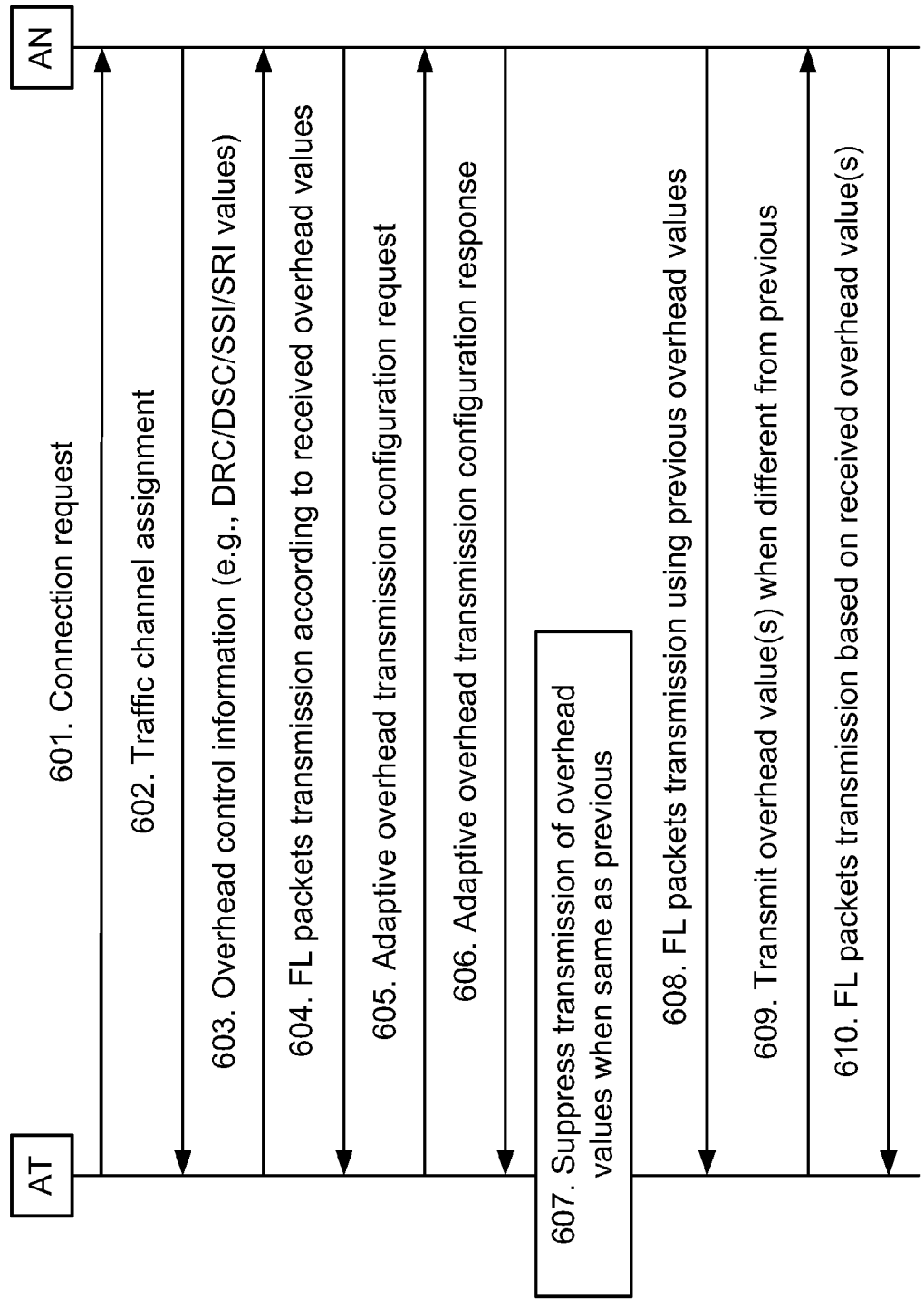
FIG. 6 shows an example of a communication flow that includes access terminal controlled adaptive transmission of overhead control information.

FIG. 6 shows an example of a communication flow that includes access terminal controlled adaptive transmission of overhead control information. An access terminal can request to send overhead control information to change how the access network is transmitting data to the access terminal. The access terminal can selectively transmit the overhead control parameters based on changes in one or more wireless channel conditions.

An access terminal can use messages such as L3 messages to enable or disable an access terminal's transmission of overhead control parameters to an access network. At 601, the access terminal sends a Connection Request (CR) message to the access network. At 602, the access network responds with a Traffic Channel Assignment (TCA) message to establish a connection with the access terminal. At 603, in the initial connection, the access terminal can transmit overhead control parameters via overhead channels such as DRC, DSC, SSI, and SRI. At 604, the access network transmits one or more forward link packets based on the received overhead control parameters.

The access terminal can activate an adaptive transmission mechanism to control forward link data transmission. For example, the access terminal can activate an adaptive transmission mechanism to control a data rate on the forward link. At 605, the access terminal sends a configuration request message to the access network to enable the adaptive transmission mechanism for overhead control parameters. If the access network supports the adaptive transmission mechanism for overhead control parameters, the access network can respond with a confirmation to the access terminal to start the adaptive transmission. In this example, at 606, the access network sends a configuration response message to inform the access terminal of support for the adaptive transmission.

The access terminal can monitor a forward link pilot and measure SINR to determine whether to transmit one or more overhead control parameters. In some implementations, for two or more overhead control parameters, an access terminal can individually determine whether to transmit an overhead control parameter value. If the access terminal determines that a change in an overhead control parameter value is not required, the access terminal is not required to transmit an overhead control parameter value to the access network. For example, if the access terminal detects that a forward link condition is similar to a previous measurement of the forward link, then the access terminal is not required to transmit an overhead control parameter value. If the access terminal detects that a forward link condition is different, the access terminal can determine a different value for a corresponding overhead control parameter and transmit the new value. At 607, the access terminal determines that overhead control parameters do not require an adjustment, the access terminal suppresses transmission of overhead control information.

Based on not receiving new overhead control parameters from the access terminal since the previous transmission of overhead control parameters, the access network uses the previously received overhead control parameter values. At 608, the access network transmits forward link packets using the previously received overhead control parameter values.

The access terminal continues to monitor the forward link condition. Based on detecting a change in the forward link condition, the access terminal can determine one or more new values for the overhead control parameters. At 609, the access terminal transmits the one or more new values for the overhead control parameters.

The access network can receive the new one or more new values for the overhead control parameters. At 610, the access network transmits forward link packets using the latest values for the overhead control parameters.

Figure 7:
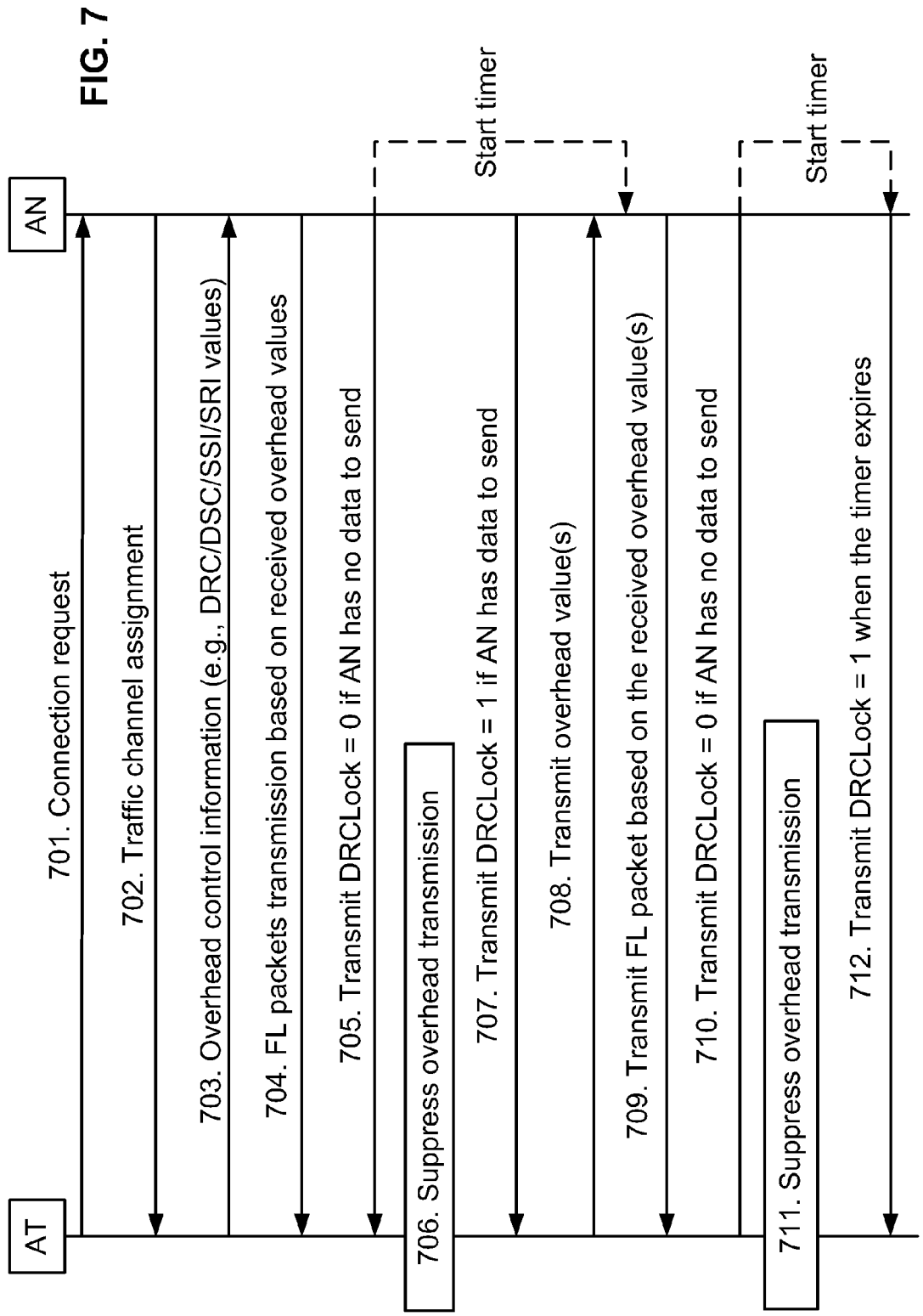
FIG. 7 shows an example of a communication flow that includes access network controlled adaptive transmission of overhead control information.

FIG. 7 shows an example of a communication flow that includes access network controlled adaptive transmission of overhead control information. An access network can transmit signaling to an access terminal to control the access terminal to transmit or cease transmitting overhead control parameters. At 701, the access terminal sends a connection request for the setup of a traffic channel. At 702, the access network sends a traffic channel assignment to establish a connection with the access terminal. At 703, after a connection is setup, the access terminal transmits overhead control parameters over respective overhead control channels such as DRC, DSC, SSI, or SRI.

The access network can use the received overhead control parameters to control forward link communications to the access terminal. At 704, the access network transmits the packets to the access terminal over one or more forward traffic channel(s) based on the received overhead control parameters.

Based on a lack of forward link buffered data for the access terminal, the access network, at 705, sends a message to cease transmission of overhead control parameters. Based on the lack, the access network can start a timer and stop monitoring overhead channels such as DRC, DSC, SSI, or SRI. Such a message can include a data rate control lock indicator, e.g., DRCLock field, that is set to zero. In some implementations, a DRCLock field is transmitted via a DRCLock channel.

The access terminal continuously monitors for DRCLock values from the access network. If the access terminal receives a DRCLock value that is set to zero from a sector in the active set which the access terminal is pointing its DRC and DSC to, the access terminal can stop pointing its DRC and DSC at that sector. If the access terminal receives a DRCLock value that is set to zero from all of the sector(s) in the active set, the access terminal can suppress transmission of overhead control parameters over an associated reverse link.

Based on receiving a DRCLock value that is set to zero, at 706, the access terminal suppresses transmission of overhead control parameters. At 707, based on having data for the access terminal, the access network transmits a DRCLock value that is set to one to trigger the access terminal to resume adaptive transmission of overhead control information. At 708, the access terminal resumes adaptive transmission of overhead control information based on a received DRCLock value. In some cases, resuming adaptive transmission can include determining whether a change to previously transmitted overhead control information is required based on the current wireless channel condition. If the access terminal has a change to previously transmitted overhead control information, then the access terminal can transmit the change based resuming adaptive transmission.

At 709, the access network transmits the packet data over the forward link traffic channel using the received overhead control information. At 710, the access network sends a DRCLock value that is set to zero to the access terminal and starts a timer if there is no more data to send. At 711, the access terminal suppresses overhead control information transmission based on receiving a DRCLock value that is set to zero from all the sectors in the active set. At 712, when the timer expires and there is still no data for the access terminal, the access network can send a DRCLock value that is set to one to trigger the access terminal to send overhead control information so that the access network can track forward link receiving conditions as observed by the access terminal.

Figure 8:
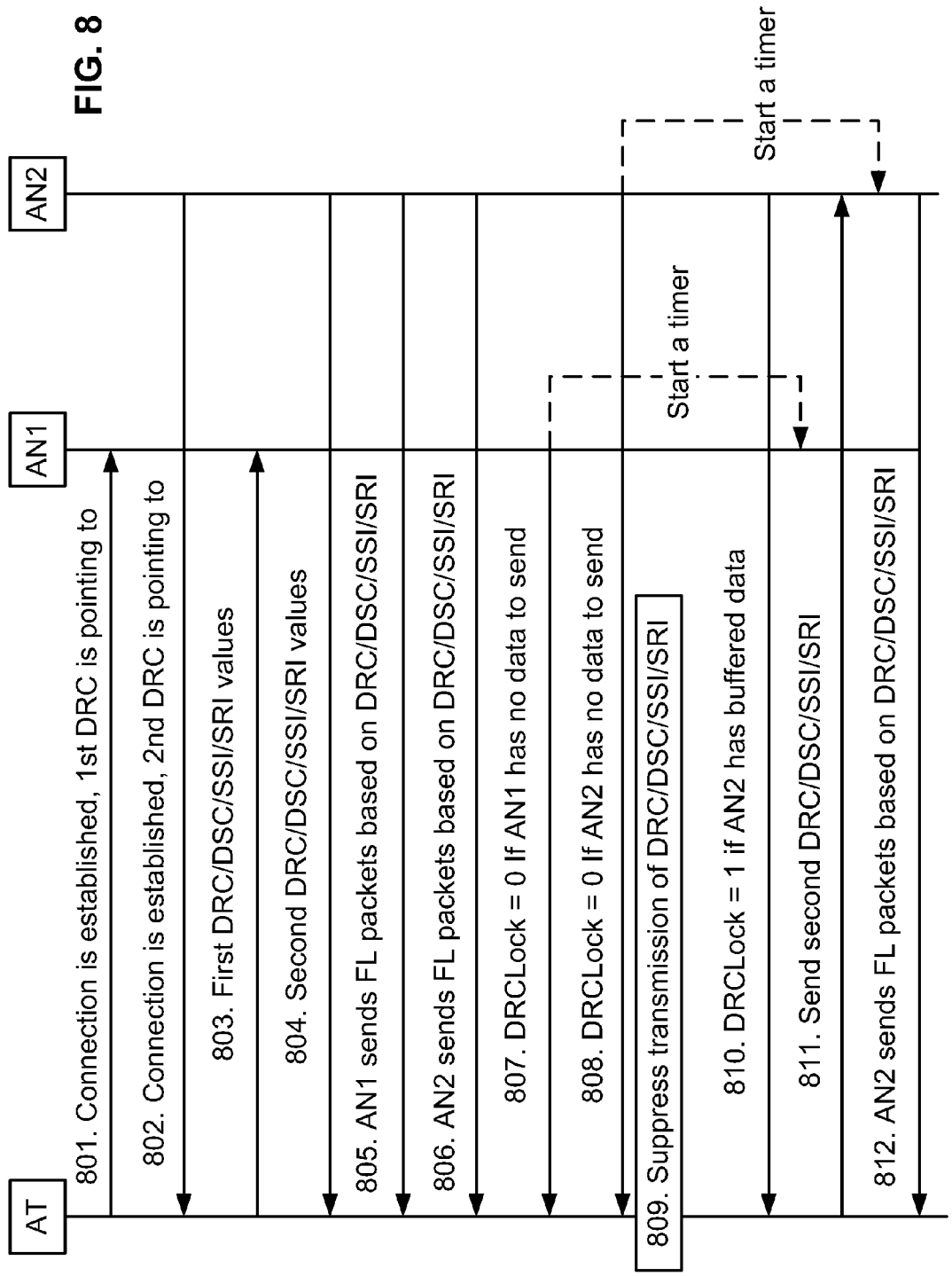
FIG. 8 shows an example of adaptive overhead transmission in single carrier multi-link connections.

FIG. 8 shows an example of adaptive overhead transmission in a single carrier multi-link connections. In this example, an access terminal is communicating with two access networks, e.g., AN1 and AN2. At 801, the access terminal establishes a first connection with AN1. At 802, the access terminal establishes a second connection with AN2. At 803, the access terminal transmits on reverse link overhead channels such as DRC, DSC, SSI, and SRI over the first reverse link to AN1. At 804, the access terminal transmits on reverse link overhead channels such as DRC, DSC, SSI, and SRI over the second reverse link to AN2.

At 805, AN1 transmits packets over the first forward traffic channel based on received first reverse link overhead control values. At 806, AN2 transmits packets over a second forward traffic channel based on received second reverse link overhead control values. At 807, if AN1 has no data to be sent over the first forward traffic channel, AN1 sends a DRCLock value that is set to zero to the access terminal to suppress the reverse link overhead transmission on the first reverse link. At 808, if AN2 has no data to be sent over the second forward traffic channel, AN1 sends a DRCLock value that is set to zero to the access terminal to suppress the reverse link overhead transmission on the second reverse link. At 809, the access terminal suppresses reverse link overhead transmissions based on respectively received DRCLock values.

At 810, if AN2 has data for the access terminal, AN2 can send a DRCLock value that is set to one to the access terminal over the second link to trigger transmission of reverse link overhead control information. At 811, the access terminal starts transmitting reverse link overhead channels on the second link. At 812, AN2 transmits packets over the traffic channel on the second link based on the newly received second reverse link overhead control values.

A fixed rate transmission is used by the access network to control the forward link transmission. In a VOIP based example, an access network is aware that there is one stream being used for application in the forward link. Therefore, the access network can request to use a fixed rate forward link transmission and, accordingly, the access terminal is not required to send DRC information. In another example, when an access terminal is attaching to a HRPD femto cell, a user can control the access terminal to stick with the femto cell and not switch to a different network. In this case, the access terminal communicates to only one network such as one network sector, and therefore, the access terminal is not required to transmit DSC and DRC cover. The fixed transmission of information such as DRC or DSC information can provide a mechanism for an access network to control the forward link transmission and let the access terminal to be able to disable DRC/DSC transmission.

Figure 9:
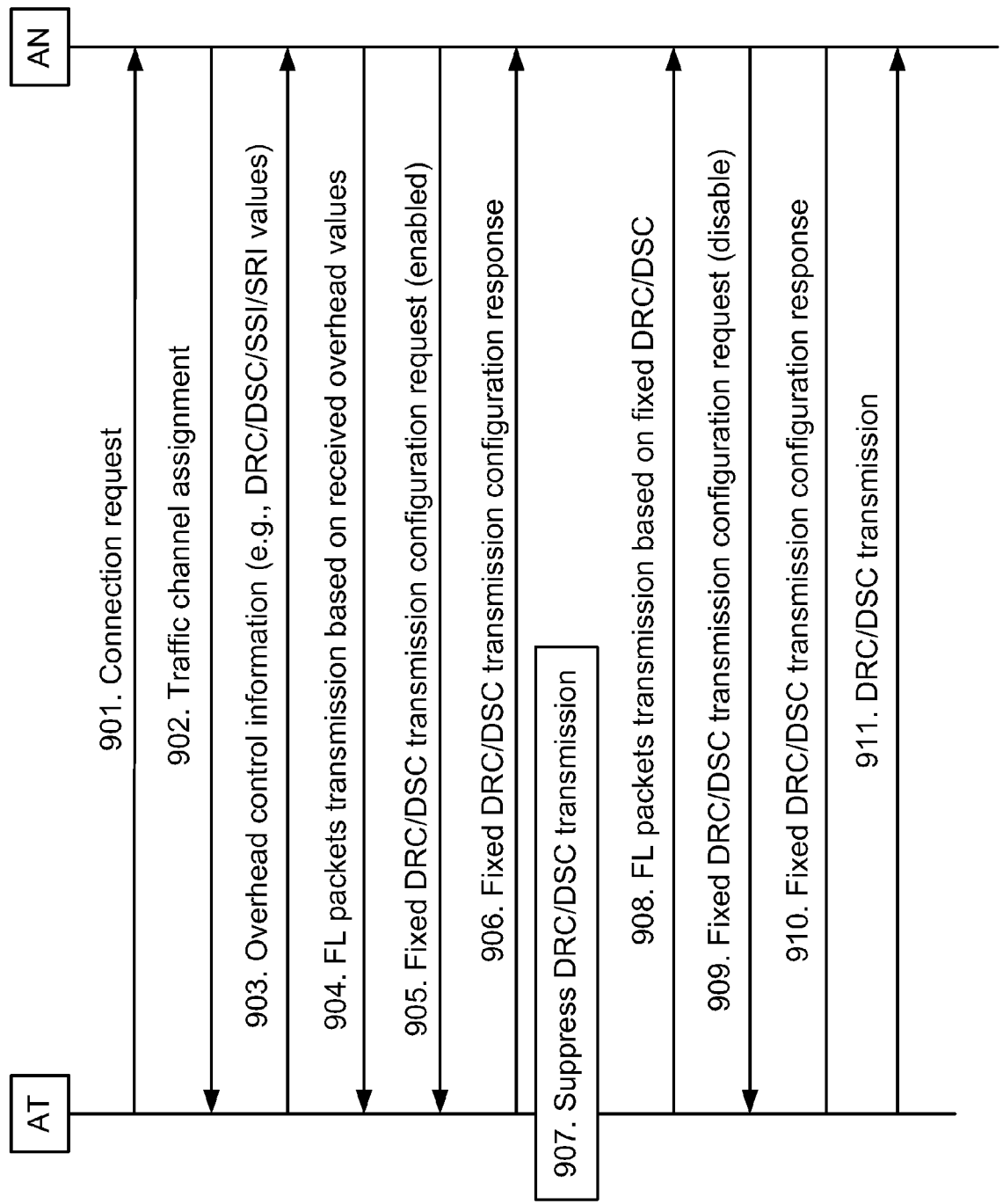
FIG. 9 shows an example of signaling exchanges between an access terminal and an access network for a fixed rate forward link transmission.

FIG. 9 shows an example of signaling exchanges between an access terminal and an access network for a fixed rate forward link transmission. An access network can determine that receiving changes to parameters associated with a forward link transmission is not required, and accordingly, transmit data at a fixed rate. Therefore, an access terminal is not required to transmit DRC and DSC information during a fixed rate transmission. An access network can use one or more messages, such as L3 messages, to enable or disable transmission of DRC and DSC information.

At 901, the access terminal sends a connection request message to the access network to request setup a traffic channel. At 902, the access network responds with the traffic channel assignment message to establish a radio connection. At 903, the access terminal transmits reverse link overhead channels such as DRC, DSC, SSI, and SRI to the access network to control the forward link transmission. At 904, based on the received reverse link overhead channels, the access network transmits forward link packets over a forward traffic channel.

At 905, if the access network is required to enable a fixed transmission of DRC and DSC information, the access network can send a fixed transmission request enablement message to the access terminal. Various examples of a fixed transmission enablement message a 'Fixed Transmit DRC Request' enable message and a 'Fixed Transmit DSC Request' enable message.

At 906, if the access terminal supports a fixed transmission, e.g., fixed DRC or DSC, the access terminal sends a response confirming the fixed transmission. At 907, the access terminal suppresses the transmission of DRC and DSC information.

At 908, the access network transmits forward link packets based on parameters associated with the fixed transmission. In some implementations, based on receiving a fixed transmission confirmation enabled message from the access terminal, the access network uses agreed DRC and DSC parameters to transmit forward link packets to the access terminal.

At 909, if the access terminal is required to disable the fixed transmission, the access terminal can send a fixed transmission disablement message to the access network. A fixed transmission disablement message can include overhead control information such as one or more DRC and DSC values. At 910, based on receiving a fixed transmission disablement messages from the access terminal, the access network can use received DRC and DSC values to transmit the forward link packets to the access terminal.

A wireless communication system can provide a combination of a fixed transmission of DRC and DSC information with an adaptive transmission of overhead control information such as DRC, DSC, SSI, and SRI information. For example, a fixed transmission of DRC and DSC is used to provide a setting point, and adaptive transmission of DRC and DSC is used to control the transmission of DRC and DSC. When the access terminal and access network are operated to use fixed rate transmission, and an adaptive overhead transmission mechanism is enabled, the access terminal monitors the receiving condition on the forward link. If the expected DRC rate is higher than the set point of the fixed rate, the access terminal is not required to transmit DRC information to the access network. If the DRC rate to be used is lower than the set point of the fixed rate, the access terminal can send a new DRC value to the access network.

Once the access network receives the new DRC value, the access network can use the value for future packet transmissions over the forward link traffic channel. Similarly, if the access terminal detects that a SINR of a connection is worse than a SINR of another wireless sector, the access terminal can transmit DRC and DSC information to the access network to trigger the new pointing sector change. The access network can transmit packets on the forward traffic channel from the sector which the DRC and DSC information is pointing at.

A reverse link fixed rate transmission can be used by an access terminal to indicate to an access network that a reverse link transmission will be at a fixed rate. Therefore, the access terminal would not need to transmit the RRI associated to the reverse link data and the access network can demodulate and decode the reverse link packet based on the fixed rate of reverse link data channel. An access terminal can use a message such as a L3 message to enable or disable reverse link fixed rate transmission. Before communicating with an access network to enable reverse link fixed rate transmission, the access terminal can check an overhead message broadcast by the access network. The overhead message broadcast can indicate that reverse link fixed rate transmission is supported by the access network. In some implementations, an overhead message broadcast can include an indicator such as a 'RL Fixed Rate' field that is set to indicate that reverse link fixed rate transmission is supported. If supported, the access terminal can initiate communication with the access network to activate reverse link fixed rate transmission. If not supported, the access terminal can transmit RRI information associated with a reverse link packet transmission.

Figure 10:
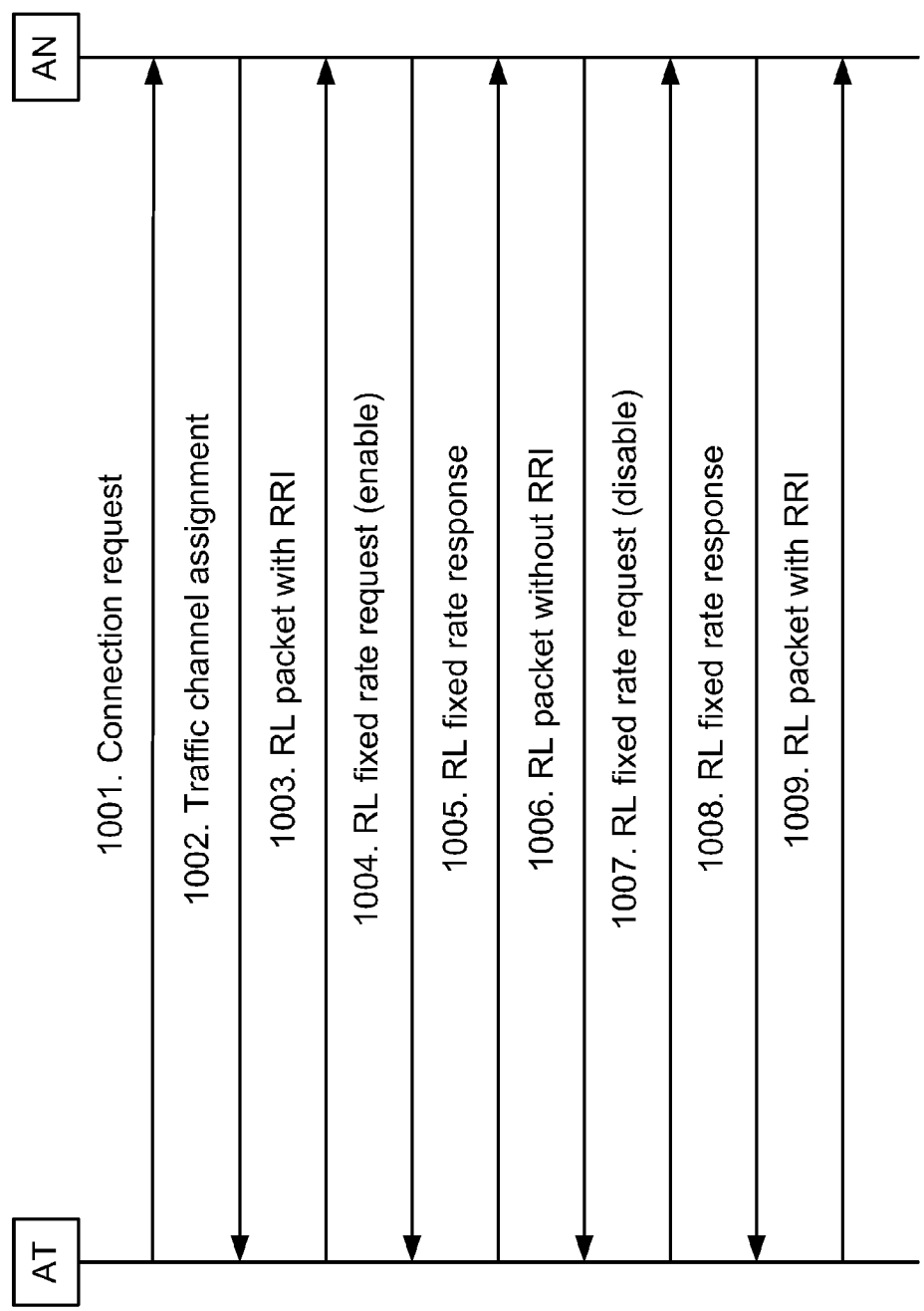
FIG. 10 shows an example of a communication flow that includes reverse link fixed rate transmission signaling.

FIG. 10 shows an example of a communication flow that includes reverse link fixed rate transmission signaling. At 1001, an access terminal sends a connection request message to setup a connection with an access network. The access network assigns a traffic channel to the access terminal. At 1002, the access network sends a traffic channel assignment message to the access terminal. At 1003, the access terminal transmits packets over the reverse link data channel with RRI information that indicates a transmission rate. At 1004, when the access terminal is required to enable a reverse link fixed rate transmission, the access terminal sends a RL Fixed Rate Request enable message to the access network. At 1005, the access network sends a RL Fixed Rate Response message to confirm enabling reverse link fixed rate transmission. At 1006, the access terminal sends reverse link packets without RRI information. In some implementations, when the access terminal receives a confirmation enabled message, e.g., a RL Fixed Rate Response message that confirms the enablement, from the access network, the access terminal enables reverse link fixed rate transmission. Based on receiving the confirmation enabled message, the access terminal can disable RRI transmission when sending packets over the reverse link. The access network can use the fixed rate to demodulate and decode the reverse link packets.

At 1007, the access terminal sends a FL Fixed Rate Request message to disable reverse link fixed rate transmission. At 1008, the access network responds to the access terminal to confirm the request. At 1009, the access terminal sends reverse link packets with RRI information. The access network can demodulate and decode the reverse link packets based on the RRI information.

Figure 11:
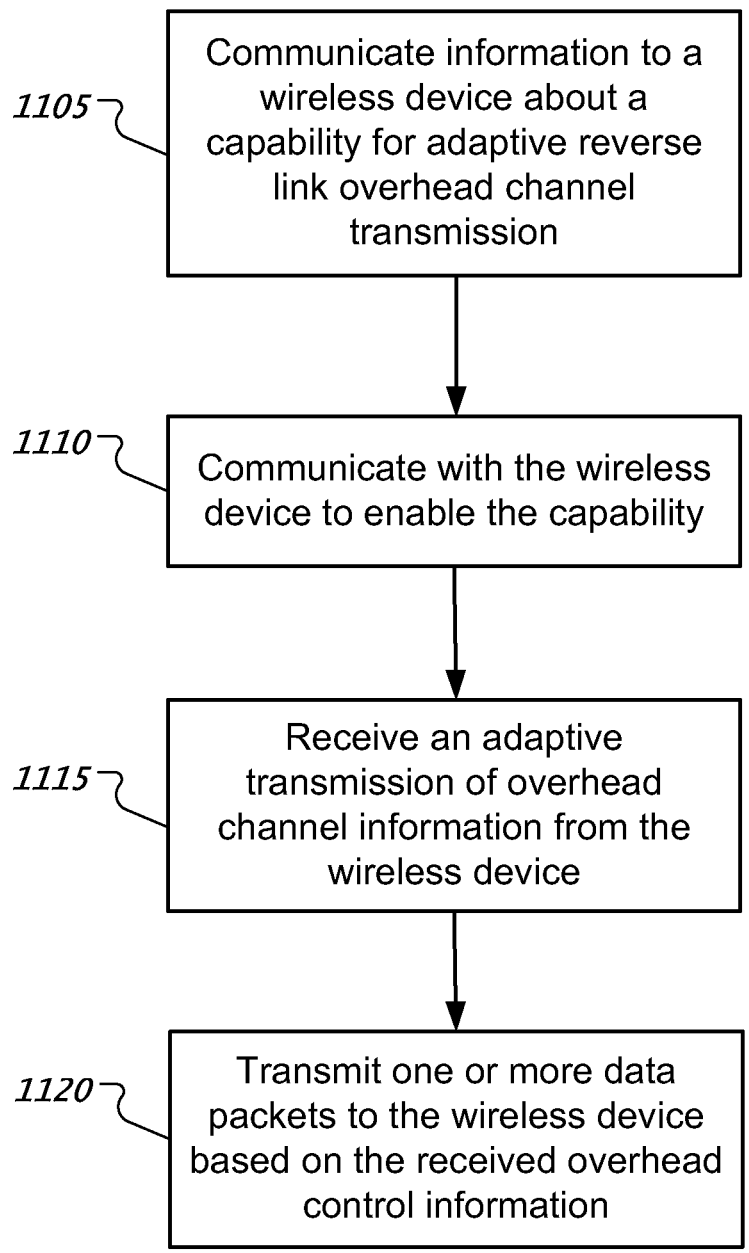
FIG. 11 shows an example of a communication process associated with adaptive reverse link overhead channel transmission.

FIG. 11 shows an example of a communication process associated with adaptive reverse link overhead channel transmission. A base station can run a communication process. In some implementations, a communication process can include one or more processes running at a base station and one or more processes running at an access network. At 1105, a communication process includes communicating information to a wireless device about a capability for adaptive reverse link overhead channel transmission. When enabled, the capability can cause the wireless device to adaptively transmit overhead channel information to control data packet transmissions to the wireless device. In some implementations, the wireless device can detect a change in a wireless channel condition that requires a change to one or more overhead channel parameters, such as a change in data rate or source.

At 1110, the communication process includes communicating with the wireless device to enable the capability. In some implementations, a base station can receive a request to active adaptive transmission of overhead control information. In some implementations, a base station can send a request to activate adaptive transmissions of overhead control information. At 1115, the communication process includes receiving an adaptive transmission of overhead channel information from the wireless. At 1120, the communication process includes transmitting one or more data packets to the wireless device based on the received overhead control information. Overhead control information can include data control information for controlling forward link transmissions. In some implementations, a wireless communication system can provide one or more mechanisms to reduce reverse signaling overhead by selectively transmitting data control information based on adapting to local wireless channel conditions.

Figure 12:
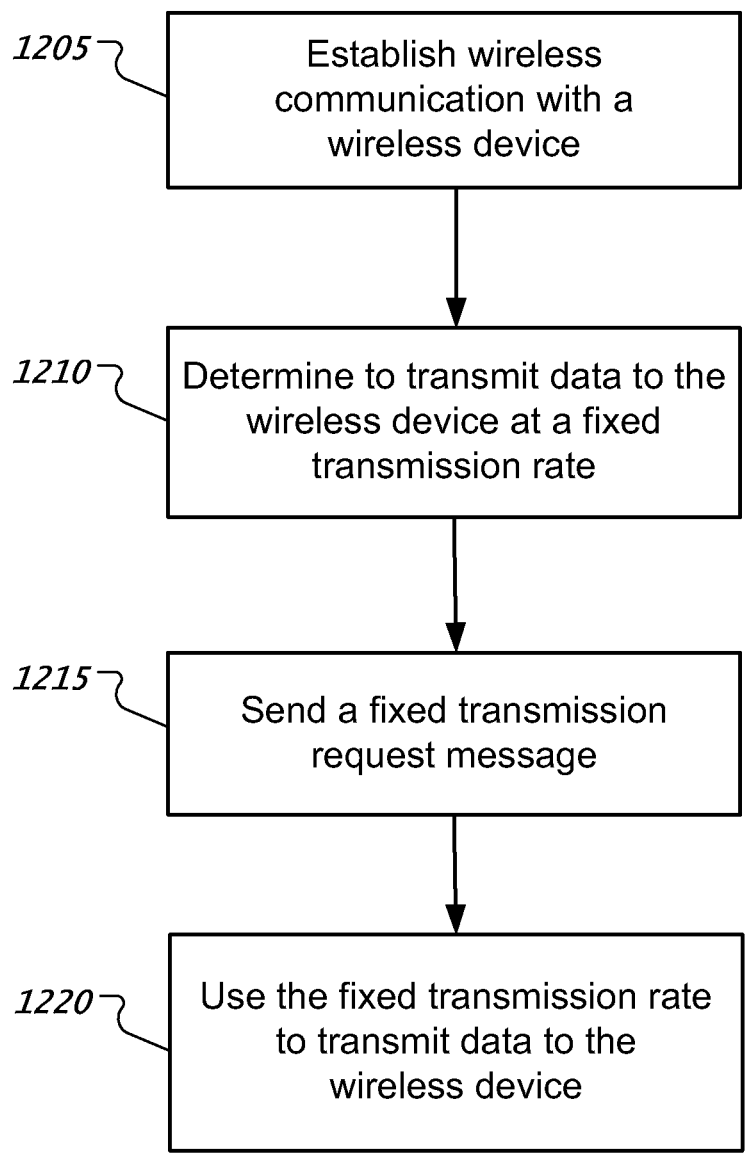
FIG. 12 shows an example of a communication process associated with fixed transmission on a forward link.

FIG. 12 shows an example of a communication process associated with fixed transmission on a forward link. At 1205, a communication process includes establishing wireless communication with a wireless device. Establishing wireless communication can include receiving an incoming connection and assigning a traffic channel. At 1210, the process includes determining to transmit data to the wireless device at a fixed transmission rate. For example, after transmitting data to a wireless device using an adaptively set data rate (e.g., the data rate can change to adapt to changes to wireless channel conditions), the base station can switch to a static transmission rate. At 1215, the process includes sending a fixed transmission request message. The message can control the wireless device to suppress transmission of overhead channel information. In some implementations, the fixed transmission request message indicates the fixed transmission rate. At 1220, the process includes using the fixed transmission rate to transmit data to the wireless device.

Figure 13:
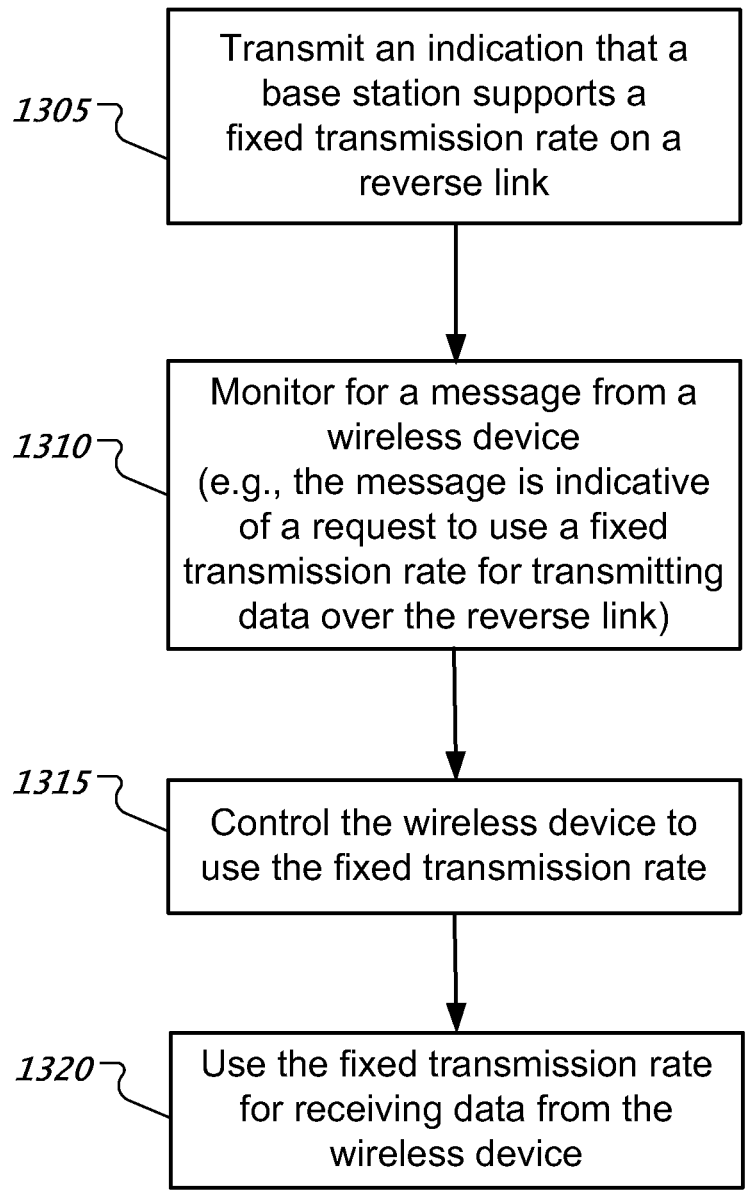
FIG. 13 shows an example of a communication process associated with fixed transmission on a reverse link.

FIG. 13 shows an example of a communication process associated with fixed transmission on a reverse link. At 1305, a communication process includes transmitting an indication that a base station supports a fixed transmission rate on a reverse link. At 1310, the process includes monitoring for a message from a wireless device. In some implementations, the message is indicative of a request to use a fixed transmission rate for transmitting data over the reverse link to the base station. At 1310, the process includes controlling the wireless device to use the fixed transmission rate. For example, a base station can send a response to confirm a fixed transmission rate on a reverse link. At 1315, the process includes using the fixed transmission rate for receiving data from the wireless device. Using the fixed transmission rate can include demodulating and decoding a reverse link signal from the wireless device based on the fixed transmission rate. In some implementations, controlling the wireless device to use the fixed transmission rate can include sending a message to cause the wireless device to suppress transmitting a data rate over a reverse rate indicator (RRI) channel.

In some implementations, wireless communication system operations include operating a base station to transmit an indication that the base station supports selective transmission of data control information over a reverse link, communicating with a wireless device who selectively transmits data control information, receiving information, including a first data control information, from the wireless device, and using the first data control information for communications with the wireless device until the base station receives second data control information from the wireless device.

In some implementations, wireless communication system operations include operating a base station to establish communications with a wireless device, sending a fixed data control information request message to control the wireless device to use a fixed transmission rate on a reverse link, and operating the base station to use the fixed transmission rate for communications with the wireless device.

In some implementations, wireless communication system operations include operating a base station to transmit an indication that the base station supports a fixed transmission rate on a reverse link, monitoring for information from a wireless device indicative of a fixed transmission rate request, and operating the base station to use the fixed transmission rate for communications with the wireless device.

In some implementations, an access terminal communicates with a base station about the capability of the access terminal controlled adaptive reverse link overhead channel transmission. The access terminal can communicate with the base station to enable or disable the adaptive reverse link overhead transmission. The access terminal can transmit the overhead control information over the reverse link adaptively.

In some implementations, an access terminal can communicate with a base station about the capability of the access network controlled adaptive reverse link overhead channel transmission. The access terminal can communicate with the base station to enable or disable the adaptive reverse link overhead transmission. The access terminal can transmit or suppress the reverse link overhead information adaptively based on an instruction from the base station.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
communicating, to a wireless device from a network, information indicative of the network's support of a capability for adaptive reverse link overhead channel transmission;
making a decision, based on the capability, whether to enable or disable an adaptive reverse link overhead channel transmission, wherein the adaptive reverse link overhead channel transmission, when enabled, causes the wireless device to adaptively transmit overhead channel information that reduces reverse link transmit power consumption by transmitting the overhead channel information based on a detected change in a wireless channel condition, and, when disabled, causes the wireless device to transmit overhead channel information in a legacy manner that requires a larger portion of reverse link transmit power by constantly transmitting the overhead channel information;
communicating to the wireless device the decision to enable or disable the adaptive reverse overhead channel transmission;
receiving, from the wireless device, the adaptively transmitted overhead channel information based on the detected change in the wireless channel condition when the adaptive reverse link overhead channel transmission is enabled;
determining, using the received overhead channel information, transmission of data packets on a forward link to the wireless device based on the detected change in the wireless channel condition;
scheduling, upon deciding the transmission of data packets, transmission of one or more data packets on a forward link to the wireless device forward when the capability is enabled; and
communicating, using availability of buffered data in the network for data transmission on the forward link, an indication to the wireless device to suppress transmission of overhead channel information in reverse link overhead channel transmissions.

2. The method of claim 1, the method further comprising:
using the capability for enabling or disabling the wireless device to adaptively transmit to the network the overhead channel information over a Data Rate Control (DRC), Data Source Control (DSC), Spatial Signature Indication (SSI), or Spatial Rank Indication (SRI) channel.

3. The method of claim 2, wherein the capability includes independent transmission over the DRC, DSC, SSI, or SRI channel as autonomously controlled by the wireless device.

4. The method of claim 3, further comprising:
operating the wireless device to transmit first overhead channel information over a reverse link to a base station in the network;
operating, when the capability is enabled, the wireless device to suppress a transmission of second overhead channel information if the second overhead channel information is identical to the first overhead channel information, and operating, when the capability is disabled, the wireless device to continue a transmission of second overhead channel information.

5. The method of claim 3 further comprising:

operating the wireless device to disable monitoring a DRC lock value when the DRC channel is not transmitted.

6. The method of claim 1, wherein communicating the indication to suppress transmission comprises transmitting the indication via a fast indication in a physical layer.

7. The method of claim 6, wherein communicating with the wireless device to enable the capability comprises transmitting a DRC lock indicator, the method further comprising:

operating the wireless device, based on the DRC lock indicator, to transmit the overhead channel information over a reverse link.

8. The method of claim 6, further comprising:

causing the wireless device to suppress future transmission of additional overhead channel information when received DRC lock indicators for two or more active sectors indicate that a suppression is required.

9. The method of claim 6, wherein transmitting the indication comprises transmitting, based on a lack of buffered data for the wireless device, a DRC lock value to control the wireless device to suppress future transmission of additional overhead channel information.

10. The method of claim 1, wherein the wireless channel condition is measured by an error rate associated with one or more packet data transmissions to the wireless device.

11. A system for wireless communications, comprising:

a wireless device;

multiple base stations configured to (1) communicate, to the wireless device, information about a capability for adaptive reverse link overhead channel transmission and an indication when reverse link overhead channel transmission is not required, (2) make a decision, based on the capability, whether to enable or disable an adaptive reverse link overhead channel transmission, wherein the adaptive reverse link overhead channel transmission, when enabled, causes the wireless device to adaptively transmit overhead channel information that reduces reverse link transmit power consumption by transmitting the overhead channel information based on a detected change in a wireless channel condition, and, when disabled, causes the wireless device to transmit overhead channel information in a legacy manner that requires a larger portion of reverse link transmit power by constantly transmitting the overhead channel information, (3) communicate to the wireless device the decision to enable or disable the adaptive reverse overhead channel transmission, (4) receive, from the wireless device, the adaptively transmitted overhead channel information based on the detected change in the wireless channel condition when the adaptive reverse link overhead channel transmission is enabled, (5) determine, using the received overhead channel information, transmission of data packets on a forward link to the wireless device based on the detected change in the wireless channel condition, (6) schedule, upon deciding the transmission of data packets, transmission of one or more data packets on a forward link to the wireless device when the capability is enabled, and (7) communicating, using availability of buffered data in the network for data transmission on the forward link, an indication to the wireless device to suppress transmission of overhead channel information in reverse link overhead channel transmissions.

12. The system of claim 11, wherein the base stations are configured to use the capability for communicating with the wireless device to receive overhead channel information from the wireless device in a Data Rate Control (DRC), Data Source Control (DSC), Spatial Signature Indication (SSI), or Spatial Rank Indication (SRI).

13. The system of claim 12, wherein the capability includes independent transmission over the DRC, DSC, SSI, or SRI channel as autonomously controlled by the wireless device.

14. The system of claim 13, wherein the wireless device is configured to (1) transmit first overhead channel information over a reverse link to the base station, and (2) when the capability is enabled, suppress a transmission of second overhead channel information if the second overhead channel information is identical to the first overhead channel information, and (3) when the capability is disabled, continue a transmission of the second overhead channel information.

15. The system of claim 13, wherein the wireless device is configured to disable monitoring a DRC lock value when the DRC channel is not transmitted.

16. The system of claim 11, wherein the indication to suppress transmission is communicated via a fast indication in a physical layer.

17. The system of claim 16, wherein the base stations are configured to transmit a DRC lock indicator, and wherein the wireless device is configured to receive the DRC lock indicator and, based on a value of the DRC lock indicator, transmit the overhead channel information over a reverse link.

18. The system of claim 17, wherein the wireless device is configured to suppress future transmission of additional overhead channel information when received DRC lock indicators for two or more active sectors indicate that a suppression is required.

19. The system of claim 16, wherein the base stations are configured to transmit, based on a lack of buffered data for the wireless device, a DRC lock value to control the wireless device to suppress future transmission of additional overhead channel information.

* * * * *